United States Patent
Peryea et al.

(10) Patent No.: US 8,783,611 B2
(45) Date of Patent: Jul. 22, 2014

(54) JETTISONABLE ARMOR

(75) Inventors: Martin Peryea, Southlake, TX (US); Jon Stewart Tatro, Hico, TX (US)

(73) Assignee: Bell Helicopter Textron Inc., Hurst, TX (US)

(*) Notice: Subject to any disclaimer, the term of this patent is extended or adjusted under 35 U.S.C. 154(b) by 1136 days.

(21) Appl. No.: 12/682,408

(22) PCT Filed: Oct. 11, 2007

(86) PCT No.: PCT/US2007/081099
§ 371 (c)(1),
(2), (4) Date: Jul. 7, 2011

(87) PCT Pub. No.: WO2009/048471
PCT Pub. Date: Apr. 16, 2009

(65) Prior Publication Data
US 2011/0252954 A1  Oct. 20, 2011

(51) Int. Cl.
  B64D 7/00 (2006.01)
  B63B 3/10 (2006.01)
  B60J 11/00 (2006.01)
  B64C 23/00 (2006.01)

(52) U.S. Cl.
  USPC ........ 244/121; 89/36.08; 89/36.11; 89/36.12; 296/187.07; 114/11; 244/130

(58) Field of Classification Search
  USPC ........... 244/121, 171.7, 130; 89/36.08, 36.11, 89/36.12; 280/770; 296/187.07; 114/14, 114/11
  See application file for complete search history.

(56) References Cited

U.S. PATENT DOCUMENTS

| | | | |
|---|---|---|---|
| 3,118,636 A * | 1/1964 | Kantrowitz et al. | 244/159.1 |
| 3,637,166 A * | 1/1972 | Nicholson et al. | 244/1 R |
| 4,867,357 A * | 9/1989 | Inglis et al. | 244/121 |
| 5,413,027 A | 5/1995 | Mixon | |
| 6,619,181 B1 | 9/2003 | Frey et al. | |
| 7,222,562 B2 * | 5/2007 | Smiley | 89/36.08 |
| 8,632,120 B2 * | 1/2014 | Antonich | 296/187.07 |
| 2009/0044695 A1 * | 2/2009 | Benjamin et al. | 89/36.08 |

FOREIGN PATENT DOCUMENTS

| | | |
|---|---|---|
| DE | 4034401 A1 | 4/1992 |
| DE | 4244546 A1 | 5/1998 |
| DE | 3729592 C1 | 10/1998 |
| GB | 2219379 A | 12/1989 |

OTHER PUBLICATIONS

International Search Report and Written Opinion for PCT International Patent Application No. PCT/US2007/081099, mailed Sep. 4, 2008.
International Preliminary Report on Patentability for PCT International Patent Application No. PCT/US2007/081099, mailed Dec. 22, 2009.
European Examination Report for European Patent Application No. 07872791.4, mailed Jan. 7, 2011.
Canadian Office Action dated Oct. 16, 2013 in corresponding Canadian Patent Application No. 2,702,266.

* cited by examiner

*Primary Examiner* — Rob Swiatek
(74) *Attorney, Agent, or Firm* — Pillsbury Winthrop Shaw Pittman LLP

(57) ABSTRACT

An aircraft has an armor releasably attached to the body of an aircraft, an actuator connecting the armor to the body of the aircraft, and a control that, upon operation, actuates the actuator to release the armor from the body.

30 Claims, 5 Drawing Sheets

JETTISONABLE ARMOR

CROSS REFERENCE TO RELATED APPLICATIONS

This is the U.S. National Phase of PCT/US2007/081099, filed Oct. 11, 2007, the entire contents of which is incorporated herein in its entirety by reference.

FIELD OF THE INVENTION

The invention relates to armor for various vehicles, including aircraft such as helicopters, fancraft, tiltrotor or airplane, and also for land or marine vehicles.

BACKGROUND OF THE INVENTION

Military aircraft flying on dangerous military assignments may be protected from ground fire or from the ballistic projectiles. In some instance, armor placed on the walls of the aircraft may be used to protect the aircraft against such ground fire or ballistic projectiles. Other vehicles may also benefit from armor.

SUMMARY

One aspect of the invention relates to an aircraft. The aircraft comprises a body, an armor, one or more actuators and a control. The armor is releasably attached in covering relation over at least a portion of the aircraft and the actuators are operatively associated with the armor. The control is operatively connected with the actuators, and operation of the control actuates the actuators to release the armor from the body.

Another aspect of the invention relates to an armor system for a vehicle. The armor system comprises an armor, one or more actuators and a control. The armor is releasably attached in covering relation over at least a portion of the vehicle. The actuators are operatively associated with the armor and the control is operatively connected with the actuators for actuating the actuators. The operation of the control actuates the actuators to release the armor from the vehicle.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
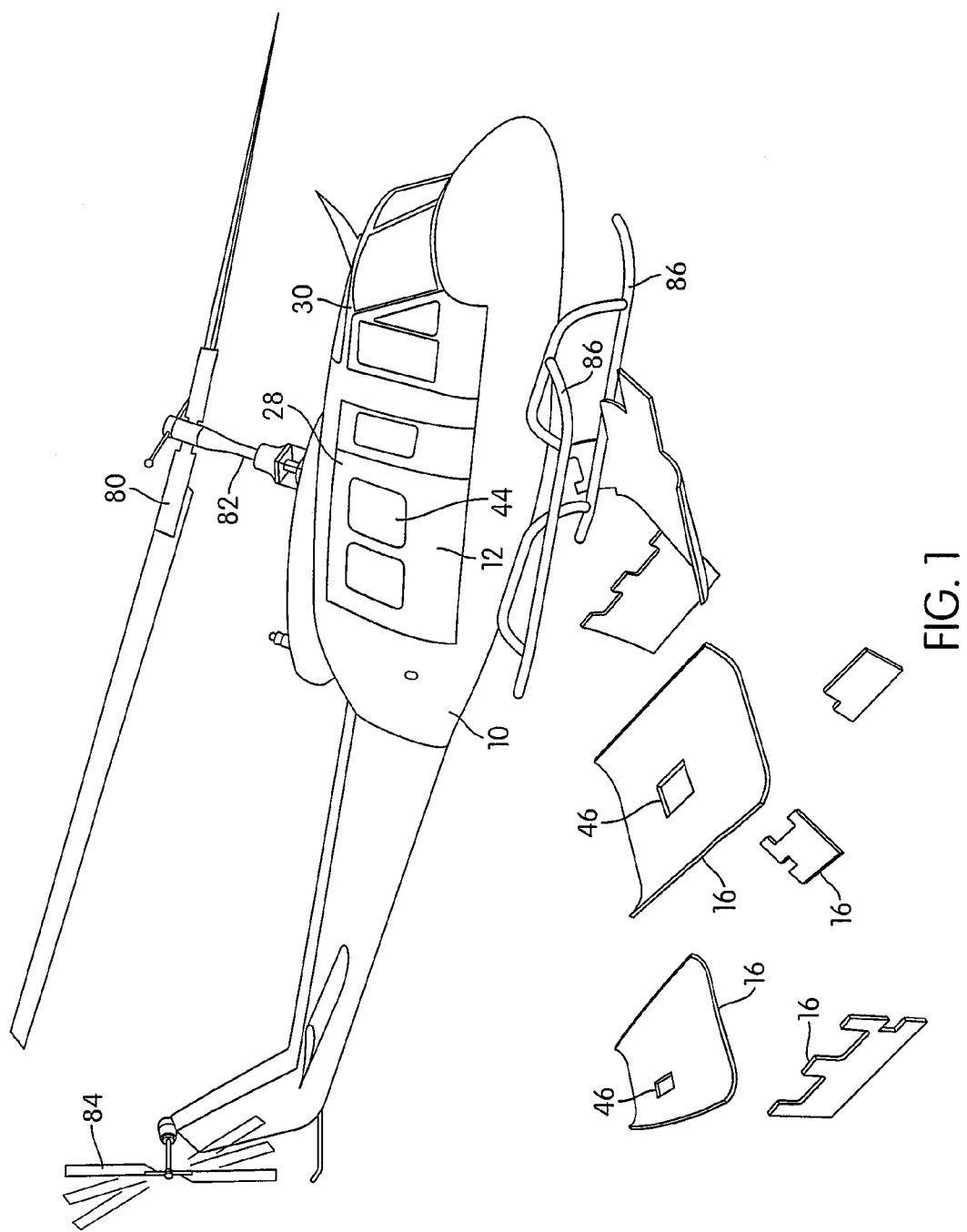
FIG. 1 is a perspective view of an aircraft with jettisonable armor, in accordance with an aspect of the present invention.

FIG. 1 is an exemplary illustration of an aircraft 10 with jettisonable armor, according to one embodiment of the invention. Aircraft 10 includes a body 12, an engine (not shown) contained in the body 12 and an armor 16. In one embodiment of the invention, body 12 includes a cabin 28 and a cockpit 30. In the illustrated, non-limiting embodiment, aircraft 10 comprises main rotor 80, drive shaft 82, tail rotor 84 and a pair of landing skids 86. The aircraft 10 further comprises one or more windows 44 located in the aircraft body 12 and the armor 16 comprises one or more openings 46.

Figure 2A:
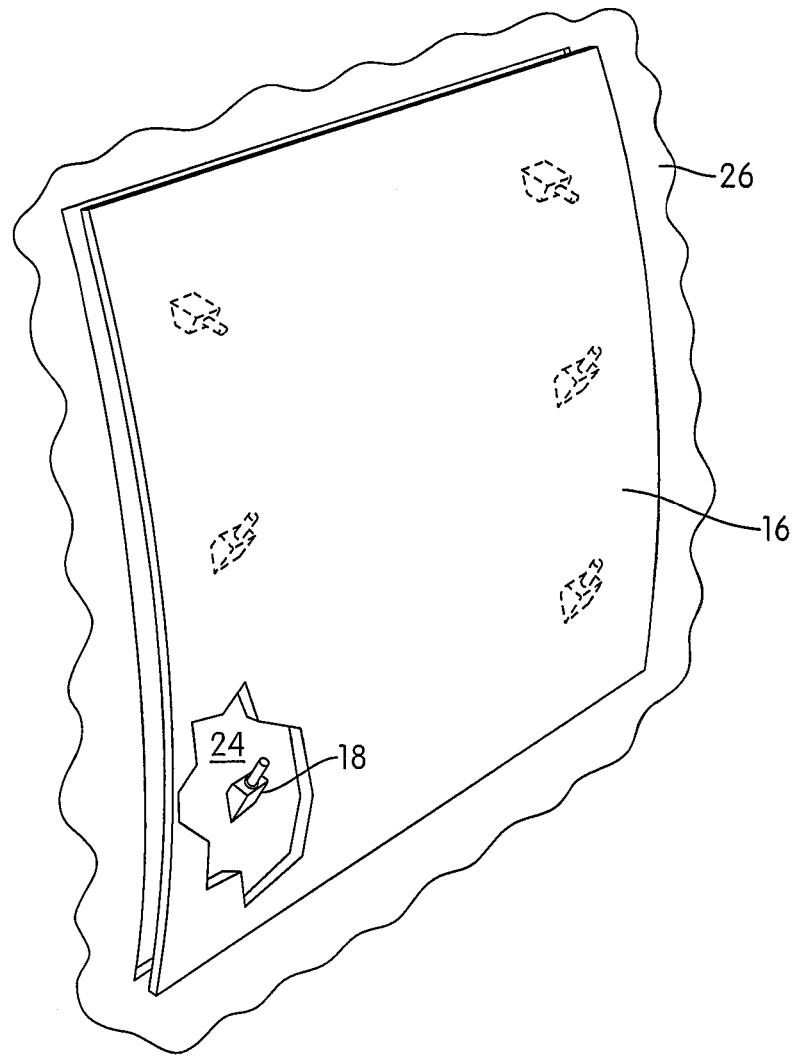
FIG. 2A is an exploded perspective view of jettisonable armor with the actuators and the actuator retainers, in accordance with an aspect of the present invention.
Figure 2B:
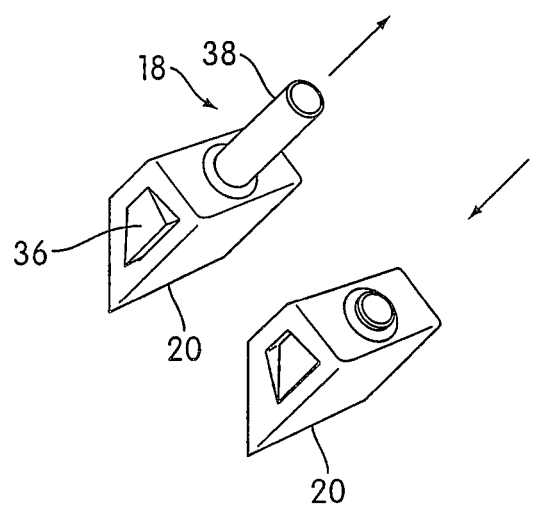
FIG. 2B is an exploded perspective view of the actuator in extended position and in retracted position, in accordance with an aspect of the present invention.
Figure 2C:
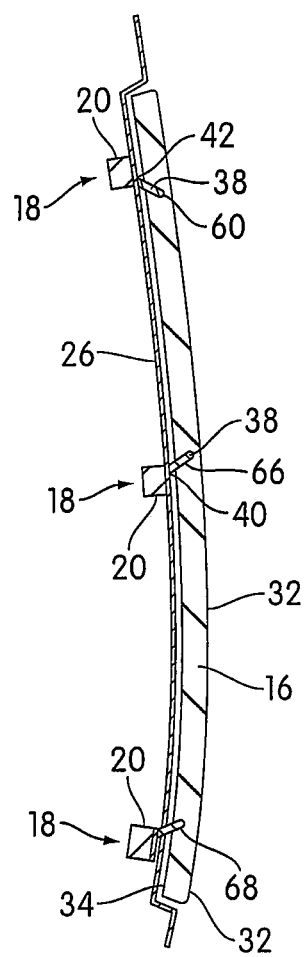
FIG. 2C is an side view of jettisonable armor with the actuators and the actuator retainers, in accordance with an aspect of the present invention.

As shown in FIGS. 2A-2C, aircraft 10 includes one or more actuators 18, one or more actuator retainers 20 and a control 22. The body 12 further comprises an airframe 24 and an exterior skin 26. The armor 16 also includes a front face 32 and a rear face 34. The armor 16 is releasably attached in covering relation over at least a portion of the skin 26 of the aircraft 10 by means of one or more actuators 18. In one embodiment, the actuators 18 each comprise an assembly that includes one or more actuator retainers 20 that are attached to the airframe 24 of the aircraft body 12, and an engagement member 38. The actuator retainers 20 are configured to receive the engagement member 38. The actuators 18 each further comprise a drive mechanism 36 for driving the engagement member 38. The rear face 34 of the armor 16 has one or more apertures 40, each of which accommodates an associated one of the engagement members 38. The aircraft skin 26 is provided with one or more holes 42 that will allow the engagement member 38 of the actuator 18 to pass through the skin 26 and engage within the associated aperture 40 of the armor 16. The engagement member 38 of the actuator 18 can be moved between an extended position and a retracted position. The drive mechanism 36 of the actuator 18 drives the engagement member 38 from the extended position to the retracted position. When the engagement member 38 is in extended position, the engagement member 38 engages with the apertures 40 located on the rear face 34 of the armor 16, thereby retaining the armor 16 in covering relation with the aircraft skin 26. When the engagement member 38 is in retracted position, the engagement member 38 is retracted into the actuator retainers 20 and withdrawn from the apertures 40, thus releasing the armor 16 from the aircraft skin 26.

In one embodiment, the engagement members 38 are shaped so that, when the actuators 18 are retracted, the actuators 18 are in flush with the outer surface of the actuator retainers 20. The engagement member 38 of the actuator 18 can be of any shape or configuration as long as it retains the armor 16 in the configuration and condition and releases the armor 16 from the skin 26 of the aircraft 10 in another configuration and condition. In the embodiment shown, the engagement member 38 is in the form of a rod, as shown. As further shown, the rods extend at different angles from one another to provide a securing interlocking configuration with the armor 16 when extended. For example, in FIG. 2C, it can be seen that the upper actuator rod 60 extends generally downwardly, while the middle rod 66 and the lower rod 68 extend upwardly. These differing angles provide locking interconnection with the armor 16. It should be appreciated, however, that this embodiment is but one example of different types of actuators and engagement shapes, configurations and/or constructions that can be provided. The engagement members 38 can be hooks, locks, dead bolts, or any type of retainer structure. The drive mechanism 36 (see FIG. 2B) of the actuator 18 is accommodated in the actuator retainers 20. The drive mechanism 36 of the actuator 18 may be a hydraulic device, a pneumatic device, a gravity driven device, a magnetic device, an electro-hydraulic device, a pyrotechnic device, a vacuum driven device, an electromagnetic solenoid, an electric motor or any other mechanical or electromechanical device that can be remotely actuated to release the armor 16. It should be appreciated that these are non-limiting examples. In another embodiment, it is contemplated that the actuator 18 and its associated components may be mounted on the armor 18 itself and may be released with the armor when the armor is released. For example, the apertures 40 may be provided in the aircraft skin 26 in such an embodiment.

In one embodiment, one or more openings 46 of the armor 16 are aligned with one or more windows 44 of the aircraft body 12. These openings 46 allow light through the windows 44 and provide an unobstructed view to a pilot of the aircraft 10. In one embodiment, the armor 16 comprises multiple plates, or spaced armor or any type of ballistic protection. These multiple plates are attached to the skin 26 of the aircraft 10 at strategic locations by using the actuators 18 and will provide protection to the aircraft 10. The specific mounting locations, orientation and geometry of the armor are tailored to each unique aircraft configuration and operating envelope. The specific armor release mechanism discussed above is also tailored to the specific aircraft and the location on the aircraft. In another embodiment, a single large piece of armor may be provided.

Figure 3:
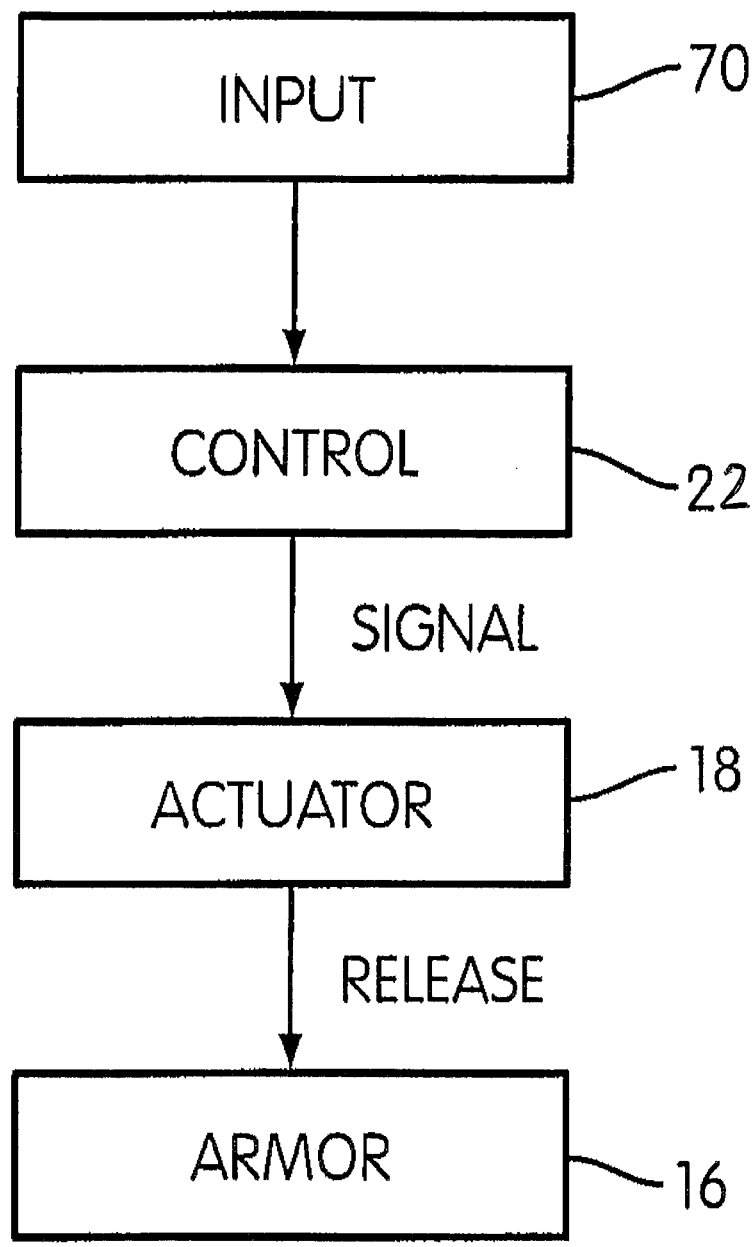
FIG. 3 is a schematic illustration of interaction between the input, the control, the actuators and the armor, in accordance with one or more embodiments of the invention.

As shown schematically in FIG. 3, the control 22 is operatively connected with each actuator 18. To release the jettisonable armor, the pilot (or co-pilot) activates the control 22 located on an instrument panel in the cockpit of the aircraft 10, by actuating an input 70, such as a button (or series of buttons), pulling a lever, flipping a switch or any other mechanism as would be apparent to one skilled in the art. The actuator 18 receives input signals from the control 22 to initiate the jettison sequence of the armor 16. The input 70 (e.g., lever, button or switch) is easily accessible to a pilot and gives the pilot the ability to start the armor jettison sequence from inside the cockpit 24. The control 22 can be a processor, a switch, or any mechanism that actuates the actuator as would be apparent to one skilled in the art. The control 22 may be designed to be independent from the other control systems of the aircraft 10, so that in case of a partial power failure, a complete power failure, an emergency or to arrest an excessive sink rate, the control 22 can be operated. In another embodiment, the control 22 may be integrated into main aircraft computer. The jettisoning of the armor can be invoked either manually (e.g., wherein the input 70 is a manual switch), semi-automatically (e.g., a combination of a manual input in combination with some automatic input from the aircraft control system upon detection of a predetermined parameter or event (e.g., excessive sink rate, just for example)), or fully automatically (e.g., wherein the input 70 is provided entirely by the aircraft control system upon detection of a predetermined parameter or event). The armor 16 may be made of any material, which has the ability to absorb energy of ballistic projectiles, may be a metal, a synthetic, a structure comprising reinforcing fibers and ceramic, or any other material as would be apparent to one skilled in the art.

As noted above, the armor 16 may be modular in nature comprising one or more plates. The armor 16 is releasably attached to the skin 26 of the aircraft 10 by using one or more actuators 18. The actuator retainers 20 located on the airframe 24 of the aircraft 10 are configured to accommodate the actuators 18. The actuators 18 extend to engage with one or more apertures 40 located on the rear face 34 of the armor 16, thus retaining the armor 16 on the skin 26 of the aircraft 10. The aircraft skin 26 has one or more holes 42 that will allow the actuators 18 to pass through the aircraft skin 26 and engage with the armor 16. If necessary, the operator of the aircraft 10 activates the control 22. The control 22 sends input signals to the actuator 18 to retract so that the armor 16 is released from the skin 26 of the aircraft 10 due to gravity. The control 22 may be located in the cockpit 30 of the aircraft 10 and is easily accessible to the pilot of the aircraft 10. The armor 16 may be provided with one or more openings 46 that are aligned with the aircraft windows 44 so as to provide light through the windows 44 and unobstructed view to the pilot of the aircraft 10.

Although the invention has been described above in relation to a helicopter, it should be appreciated that the invention can also be used for other vehicles such as land vehicles (e.g., jeeps, tanks, etc) or marine vehicles (e.g., ships, boats, etc).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it should be understood that the present invention contemplates that, to the extent possible, one or more features of any embodiment can be combined with one or more features of any other embodiment.

What is claimed is:

1. An aircraft comprising:
 a body;
 an armor releasably attached in covering relation over at least a portion of the body, the armor being exposed to an external environment and arranged to protect the portion of the body which it is in covering relation with while being attached;
 one or more actuators operatively associated with the armor, the armor being releasably attached to the body of the aircraft using the one or more actuators; and
 a control operatively connected with the one or more actuators for actuating the one or more actuators, wherein operation of the control actuates the one or more actuators to release the armor from the body.

2. The aircraft in claim 1, wherein the body has an airframe, an exterior skin, a cabin and a cockpit located within the airframe.

3. The aircraft of claim 2, wherein one or more actuator retainers are attached to the airframe and are configured to accommodate the one or more actuators.

4. The aircraft of claim 3, wherein the one or more actuators are configured to extend from the one or more actuator retainers to retain the armor and to retract into the one or more actuator retainers to release the armor.

5. The aircraft of claim 3, wherein the operation of the control sends a signal to the one or more actuator retainers to actuate the one or more actuators to release the armor from the skin of the aircraft.

6. The aircraft in claim 2, wherein the cabin and the cockpit have one or more windows located in the aircraft body enclosed by the skin and the armor is provided with one or more openings that are designed to align with the one or more windows of the aircraft.

7. The aircraft of claim 2, wherein the armor is releasably attached to the skin of the aircraft using the one or more actuators.

8. The aircraft of claim 2, wherein one or more holes are located in the aircraft skin that will allow the one or more actuators to pass through the skin and engage with the armor.

9. The aircraft of claim 2, wherein one or more apertures are located on the rear face of the armor to accommodate the one or more actuators in an extended position so as to retain the armor with the skin.

10. The aircraft of claim 2, wherein the control is activated by actuating an input that is located in the cockpit of the aircraft and is configured to be accessible to one or more pilots of the aircraft.

11. The aircraft of claim 10, wherein the input is selected from the group consisting of a switch, a lever and a button.

12. The aircraft of claim 1, wherein the armor is designed aerodynamically to reduce the drag.

13. The aircraft of claim 1, wherein the armor is made of a material selected from the group consisting of a metal, a synthetic, and a structure comprising reinforcing fibers and a ceramic.

14. The aircraft of claim 1, wherein the one or more actuators are selected from the group consisting of a fluid driven device, a gravity driven device, a pyrotechnic device, an electromagnetic solenoid and an electric motor.

15. the aircraft of claim 1, wherein the armor is separated from the body due to gravity.

16. The aircraft of claim 1, wherein the operation of the control actuates the one or more actuators to release the armor from the body such that the armor is no longer retained on the body.

17. An armor system for a vehicle, the armor system comprising:
an armor releasably attached in covering relation over at least a portion of the vehicle; the armor being exposed to an external environment and arranged to protect the portion of the vehicle which it is in covering relation with while being attached;
one or more actuators operatively associated with the armor, the armor being releasably attached to a body of the vehicle using the one or more actuators; and
a control operatively connected with the one or more actuators for actuating the one or more actuators,
wherein operation of the control actuates the one or more actuators to release the armor from the vehicle.

18. The armor system of claim 17, wherein the one or more actuators are configured to extend to retain the armor and are configured to retract to release the armor.

19. The armor system of claim 17, wherein one or more apertures are located on the armor to accommodate the one or more actuators in an extended position so as to retain the armor with the vehicle.

20. The armor system of claim 17, wherein the armor is provided with one or more openings that are designed to align with one or more windows of the vehicle.

21. The armor system of claim 17, wherein the control is activated by actuating an input located in the vehicle.

22. The armor system of claim 21, wherein the input is selected from the group consisting of a switch, a lever and a button.

23. The armor system of claim 17, wherein the control sends a signal to actuate the one or more actuators to release the armor from the vehicle.

24. The armor system of claim 17, wherein the one or more actuators are selected from the group consisting of a fluid driven device, a gravity driven device, a pyrotechnic device, an electromagnetic solenoid and an electric motor.

25. The armor system of claim 17, wherein the armor is made of a material selected from the group consisting of a metal, a synthetic, and a structure comprising reinforcing fibers and a ceramic.

26. The armor system of claim 17, wherein the vehicle is an aircraft.

27. The armor system of claim 17, wherein the armor is separated from the vehicle due to gravity.

28. The armor system of claim 17, wherein the operation of the control actuates the one or more actuators to release the armor from the vehicles such that the armor is no longer retained on the vehicle.

29. An armor system for a vehicle, the armor system comprising:
an armor releasably attached in covering relation over at least a portion of the vehicle, the armor being exposed to an external environment and arranged to protect the portion of the vehicle which it is in covering relation with while being attached;
one or more actuators operatively associated with the armor; and
a control operatively connected with the one or more actuators for actuating the one or more actuators,
wherein operation of the control actuates the one or more actuators to release the armor from the vehicle, and
wherein the vehicle is a land vehicle.

30. An armor system for a vehicle, the armor system comprising:
an armor releasably attached in covering relation over at least a portion of the vehicle, the armor being exposed to an external environment and arranged to protect the portion of the vehicle which it is in covering relation with while being attached;
one or more actuators operatively associated with the armor; and
a control operatively connected with the one or more actuators for actuating the one or more actuators,
wherein operation of the control actuates the one or more actuators to release the armor from the vehicle, and
wherein the vehicle is a marine vehicle.

* * * * *